UNITED STATES PATENT OFFICE

LUDWIG KÖHLER, OF COLOGNE-ON-THE-RHINE, ASSIGNOR TO I. G. FARBENINDUSTRIE AKTIENGESELLSCHAFT, OF FRANKFORT-ON-THE-MAIN, GERMANY

MANUFACTURE OF MODELS OF JAWS

No Drawing. Application filed February 19, 1931, Serial No. 517,122, and in Germany March 3, 1930.

The present invention relates to a process for the manufacture of models of jaws or the like, in particular for dental purposes.

In dental practice the need often arises, for example, in taking impressions, for isolating masses of plaster of Paris from one another by means of an intermediate layer in such a manner that on removing one of these two masses, that in which the impression was taken, say by means of the spatula or in the case of varieties of plaster of Paris enabling boiling away, the mass can be removed satisfactorily from the remaining model without tearing away pieces of the latter. Various aqueous solutions, such as for example, those of sodium carbonate and the like or organic solutions, such as for example, shellac in alcohol have repeatedly been tried for this purpose.

According to the present invention the manufacture of models of jaws or the like by means of a plaster of Paris impression taken in the mouth of the patient and a plaster of Paris modelling mass filled into the impression and separated therefrom by a fine membrane is performed in forming this separating membrane by coating the impression with a liquid containing rubber, preferably with an aqueous emulsion of vulcanized natural or artificial rubber.

In performing my invention a layer of rubber is employed for separating the two masses from one another. Vulcanized rubber has been found to operate as a particularly satisfactory isolating agent, the layer being produced by coating the impression with an aqueous emulsion of natural or artificial rubber. Diluted latex and vultex emulsions and also strongly diluted revertex and revultex emulsions can be used for the invention. When such an emulsion, containing about 1–10% of rubber is well brushed on to the impression taken by means of any desired variety of plaster of Paris there is formed in quite a short time a thin rubber membrane, which isolates well. When, after the modelling plaster has been filled in and has hardened, the plaster of the impression is tapped or boiled away, this thin rubber membrane can be pulled off, thus removing quickly and with certainty all contaminating particles of the impression mass. By this means a clean and sharp model is produced.

I claim:—

1. Process for the manufacture of models, comprising coating a plaster of Paris impression with a liquid containing rubber, filling a modelling mass into the rubber coated impression, removing the impression after hardening of the modelling mass and pulling off the rubber membrane.

2. Process for the manufacture of models, comprising coating a plaster of Paris impression with a liquid containing vulcanized rubber, filling a modelling mass into the rubber coated impression, removing the impression after hardening of the modelling mass and pulling off the rubber membrane.

3. Process for the manufacture of models, comprising coating a plaster of Paris impression with an aqueous emulsion containing vulcanized rubber, filling a modelling mass into the rubber coated impression, removing the impression after hardening of the modelling mass and pulling off the rubber membrane.

4. Process for the manufacture of dental models, comprising coating a plaster of Paris impression taken in the mouth of the patient with an aqueous emulsion of vulcanized rubber, filling a plaster of Paris modelling mass into the rubber coated impression, removing the impression after hardening of the modelling mass and pulling off the rubber membrane.

5. Process for the manufacture of dental models, comprising coating a plaster of Paris impression taken in the mouth of the patient with an aqueous emulsion of 1–10% of vulcanized rubber, filling a plaster of Paris modelling mass into the rubber coated impression, removing the impression after hardening of the modelling mass and pulling off the rubber membrane.

In testimony whereof, I affix my signature.

LUDWIG KÖHLER.